United States Patent
Kim et al.

(10) Patent No.: US 12,077,448 B2
(45) Date of Patent: Sep. 3, 2024

(54) CERIA NANOPARTICLES AND CERIA NANOPARTICLES PREPARATION METHOD

(71) Applicant: RESEARCH & BUSINESS FOUNDATION SUNGKYUNKWAN UNIVERSITY, Suwon-si (KR)

(72) Inventors: Jaeyun Kim, Suwon-si (KR); Seung Woo Choi, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 81 days.

(21) Appl. No.: 17/502,257

(22) Filed: Oct. 15, 2021

(65) Prior Publication Data
US 2022/0119270 A1    Apr. 21, 2022

(30) Foreign Application Priority Data

Oct. 16, 2020  (KR) .................. 10-2020-0134388

(51) Int. Cl.
*C01F 17/235*  (2020.01)
*B82Y 40/00*   (2011.01)

(52) U.S. Cl.
CPC ............ *C01F 17/235* (2020.01); *B82Y 40/00* (2013.01); *C01P 2004/04* (2013.01); *C01P 2004/62* (2013.01); *C01P 2004/64* (2013.01)

(58) Field of Classification Search
CPC .... C01F 17/235; B82Y 40/00; C01P 2004/04; C01P 2004/62; C01P 2004/64; C09K 15/02
See application file for complete search history.

(56) References Cited

U.S. PATENT DOCUMENTS

| 2015/0190503 A1* | 7/2015 | Schanen | A61K 39/21 424/278.1 |
| 2022/0030857 A1* | 2/2022 | Sekiguchi | C01F 17/235 |

FOREIGN PATENT DOCUMENTS

| CN | 106540707 A  | * | 3/2017  | ............ B01J 23/83 |
| CN | 106622380 A  | * | 5/2017  | ......... B01D 53/8628 |
| CN | 107381616 A  | * | 11/2017 | .......... C01F 17/0043 |
| CN | 109622009 A  | * | 4/2019  | ............ B01J 27/24 |
| CN | 111760595 A  | * | 10/2020 | |
| KR | 10-2015-0041681 A | | 4/2015 | |
| WO | WO-2018179064 A1 | * | 10/2018 | ............ C01F 17/235 |
| WO | WO-2020129963 A1 | * | 6/2020 | ............ A01N 25/26 |
| WO | WO-2021251436 A1 | * | 12/2021 | |

OTHER PUBLICATIONS

Oh, Myoung-Hwan, et al. "Novel method to control the size of well-crystalline ceria particles by hydrothermal method." Materials Chemistry and Physics 124.1 (2010): 134-139.*
Rubio, Laura, et al. "Antioxidant and anti-genotoxic properties of cerium oxide nanoparticles in a pulmonary-like cell system." Archives of toxicology 90 (2016): 269-278.*
English machine translation of WO2021251436 (Year: 2021).*

(Continued)

*Primary Examiner* — Richard M Rump
(74) *Attorney, Agent, or Firm* — NSIP Law (57) ABSTRACT

A ceria nanoparticles preparation method is provided. The method includes preparing a mixed solution containing a cerium precursor and an imidazole derivative and preparing ceria nanoparticles by stirring the mixed solution.

10 Claims, 8 Drawing Sheets

S100 — Prepare mixed solution containing cerium precursor and imidazole derivative S200 — Manufacture ceria nanoparticles by stirring mixed solution (56) References Cited

OTHER PUBLICATIONS

Motamedi, M., et al. "One-pot synthesis and construction of a high performance metal-organic structured nano pigment based on nanoceria decorated cerium (III)-imidazole network (NC/CIN) for effective epoxy composite coating anti-corrosion and thermo-mechanical properties improvement." *Chemical Engineering Journal.* 2020, vol. 382, Article No. 122820, Sep. 12, 2019, (15 pages in English).
Korean Office Action issued on Feb. 15, 2022, in a counterpart Korean Application No. 10-2020-0134388 (4 pages in Korean).

* cited by examiner

CERIA NANOPARTICLES AND CERIA NANOPARTICLES PREPARATION METHOD

CROSS-REFERENCE TO RELATED APPLICATION(S)

This application claims the benefit under 35 U.S.C. § 119 of Korean Patent Application No. 10-2020-0134388 filed on Oct. 16, 2020, in the Korean Intellectual Property Office, the entire disclosure of which is incorporated herein by reference for all purposes.

BACKGROUND

1. Field

The following description relates to ceria nanoparticles and a ceria nanoparticles preparation method.

2. Description of Related Art

Reactive oxygen species may decrease battery efficiency when they are excessively generated in batteries, etc., and the reactive oxygen species may cause various diseases to be generated due to oxidative damage to cell membranes or proteins and DNA when they are excessively generated in in vivo.

Ceria ($CeO_2$) may be utilized as a catalyst, a solid battery electrolyte, a UV filter material, an oxygen sensor, an optical instrument, etc. since it has thermal stability at high temperatures and may have excellent redox reactivity.

Ceria nanoparticles may be a material that has superior reactive oxygen species removal ability. Specifically, ceria nanoparticles may bind oxygen reversibly, and may have free radical removal activity due to a change in the oxidation state between $Ce^{3+}$ and $Ce^{4+}$ on the surface of $CeO_2$ nanoparticles.

In order to industrially use the ceria nanoparticles in various fields such as diagnosis, treatment, and energy fields, it may be beneficial to mass-produce ceria nanoparticles having a uniform size of several nm level. Accordingly, it may be beneficial to mass-synthesize ceria nanoparticles having a uniform size of several nm level.

However, in a typical ceria nanoparticles preparation method, it is not only difficult to uniformly prepare the ceria nanoparticles to a nano size, but it also may not be easy to prepare the ceria nanoparticles to a fine size of 100 nm or less.

Specifically, ceria nanoparticles synthesized through a hydrothermal method, which is one of the liquid phase methods, may have a size of mostly several hundred nanometers (nm) to several microns. However, these primary particles having a size of several nm to several tens of nm may be aggregated by hydrogen bonding to form secondary particles having a size of several hundreds of nm to several microns. It may be difficult to precisely pulverize and classify these secondary particles to control the particle size.

Further, although a sol-gel method may be implemented, synthesis itself of ceria nanoparticles is not only difficult, but it may also be difficult to maintain dispersibility of the particles even if synthesized, and there is a limitation in the solvent used. Further, the process may be complicated, and economical efficiency and yield of the preparing process may be low so that mass production of ceria nanoparticles may be limited.

Further, in the typical ceria nanoparticles preparation method, an operation of performing a heating process to high temperatures for a long time in the synthesis process should be essentially included.

Specifically, in implementing a ligand capping method used for preparing typical ceria nanoparticles, an operation of performing a heating process to activate the ligand in the synthesis process is essentially included.

Further, for the reaction and crystallization even in the implementation of a hydrothermal method or a method of preparing a precursor and then converting it into ceria nanoparticles, an operation of performing a heating process to high temperatures for a long time in the synthesis process is essentially included.

Accordingly, special equipment such as a hot plate, an autoclave, an oven for calcination, etc. may be necessary for heating, and mass production may be difficult due to high cost and long heating times, etc.

Further, since the typical ceria nanoparticles preparation method may essentially include an operation of performing a heating process to high temperatures for a long time, a problem may occur wherein uniformity and reactive oxygen species removal performance of the prepared nanoparticles are greatly lowered.

Further, since the amount of ceria nanoparticles that can be prepared through a one-time batch process reaction is only about a few milligrams in the typical ceria nanoparticles preparation method, it may be problematic to apply the typical ceria nanoparticles preparation method to a commercial production process.

Therefore, it may be beneficial to develop a ceria nanoparticles preparation method that mass-prepares ceria nanoparticles having a small average particle diameter and a uniform particle size distribution.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In a general aspect, a ceria nanoparticles preparation method includes preparing a mixed solution containing a cerium precursor and an imidazole derivative; and preparing ceria nanoparticles by stirring the mixed solution.

The preparing of the ceria nanoparticles may be performed at room temperature.

The mixed solution may be composed of a solvent, the cerium precursor, and the imidazole derivative.

The cerium precursor may include one of cerium(III) acetate hydrate, cerium(III) acetylacetonate hydrate, cerium (III) carbonate hydrate, cerium(IV) hydroxide, cerium(III) fluoride, cerium(IV) fluoride, cerium(III) chloride, cerium (III) chloride heptahydrate, cerium(III) bromide, cerium(III) iodide, cerium(III) nitrate hexahydrate, cerium(III) oxalate hydrate, cerium(III) sulfate, cerium(III) sulfate hydrate, cerium(IV) sulfate, cerium nitrate, cerium ammonium nitrate, cerium sulfate, cerium phosphate, cerium chloride, cerium carbonate, cerium acetate, and combinations thereof.

The imidazole derivative may include one of imidazole, 2-methylimidazole, benzimidazole, naphthimidazole, phenanthroimidazole, pyridiimidazole (pyridine imidazole), pyrazineimidazole (pyrazine imidazole), quinoxalineimidazole (quinoxaline imidazole), 4-methylimidazole, 4-methyl-2-phenylimidazole, and combinations thereof.

A solvent of the mixed solution may include one of distilled water, acetone, xylene, toluene, mesitylene, octyl ether, butyl ether, hexyl ether, decyl ether, pyridine, dimethyl sulfoxide, dimethylformamide, octanol, decanol, octane, decane, dodecane, tetradecane, hexadecane, hexane, carbon disulfide, chlorobenzene, dioxolane, tetrahydrofuran (THF), ethylenediamine, ethanol, methanol, and combinations thereof.

The stirring of the mixed solution may be performed with one of a magnetic bar, a magnetic stirrer, a rotary mixer, shaker, rotators, and combinations thereof.

The preparing of the ceria nanoparticles may be performed for 1 minute to 3 hours.

The method may include washing the ceria nanoparticles.

The washing of the ceria nanoparticles may be performed one or more times by using a solution selected from the group consisting of acetone, distilled water, isopropanol, n-propanol, methanol, ethanol, 1-methyl-2-pyrrolidone, and combinations thereof.

The method may include drying the ceria nanoparticles.

The method may include adjusting a solvent of the mixed solution to adjust a diameter of the ceria nanoparticles.

The ceria nanoparticles may have an average particle diameter of 1 to 200 nm.

The method may include providing an antioxidant that includes the ceria nanoparticles.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, ceria nanoparticles according to one or more examples and a ceria nanoparticles preparation method will be described in detail with reference to embodiments, examples, and drawings. However, the examples are not limited to such embodiments, examples, and drawings.

Figure 1:
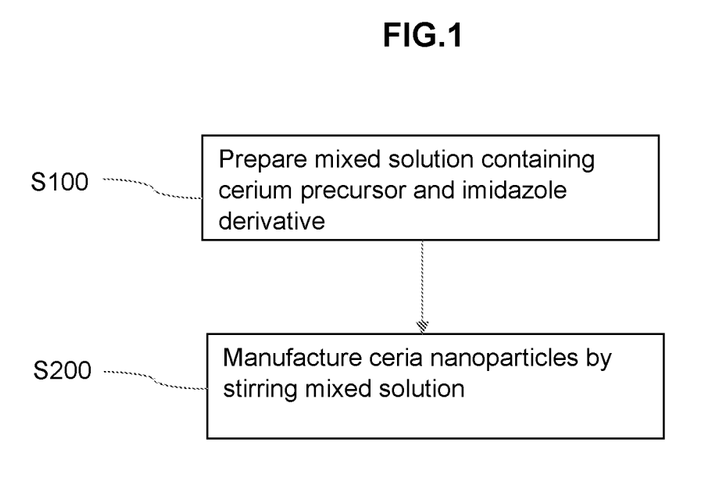
FIG. 1 is a flowchart illustrating an example ceria nanoparticles preparation method, in accordance with one or more embodiments.

FIG. 1 is a flowchart illustrating an example ceria nanoparticles preparation method, in accordance with one or more embodiments.

One or more examples may include a ceria nanoparticles preparation method, including the operations of preparing a mixed solution containing a cerium precursor and an imidazole derivative, and preparing ceria nanoparticles by stirring the mixed solution.

The reactive oxygen species may decrease the battery efficiency when they are excessively generated in batteries, etc., and the reactive oxygen species may cause various diseases to be generated due to oxidative damage to cell membranes or proteins and DNA when they are excessively generated in in vivo.

Ceria ($CeO_2$) has been widely applied as a catalyst, a solid battery electrolyte, a UV filter material, an oxygen sensor, an optical instrument, etc. since it has thermal stability at high temperatures and has characteristics of excellent redox reactivity.

Ceria nanoparticles may be a material that has superior reactive oxygen species removal ability. Specifically, ceria nanoparticles may bind oxygen reversibly, and may have free radical removal activity due to a change in the oxidation state between $Ce^{3+}$ and $Ce^{4+}$ on the surface of $CeO_2$ nanoparticles.

In order to industrially use the ceria nanoparticles in various fields such as diagnosis, treatment, and energy fields, it may be beneficial to mass-produce or mass-synthesize ceria nanoparticles having a uniform size of several nm level.

In order to prepare the ceria nanoparticles, an operation of preparing a mixed solution containing a cerium precursor and an imidazole derivative is first performed (operation S100).

In one or more examples, although the operation of preparing the ceria nanoparticles may be performed at room temperature, the examples are not limited thereto.

Specifically, although the operation of preparing the ceria nanoparticles may be performed in a temperature range of about 15° C., the examples are not limited thereto.

In the typical ceria nanoparticles preparation method, there has been a problem that uniformity and reactive oxygen species removal performance of the nanoparticles may be greatly lowered since the operation of performing a heating process to high temperatures for a long time in the synthesis process is essentially included.

However, since the ceria nanoparticles preparation method according to the one or more examples may be performed at room temperature, the example method may prepare ceria nanoparticles having a small average particle diameter and a uniform particle size distribution in large quantities.

Further, in the typical ceria nanoparticles preparation method, since special equipment such as a hot plate, an autoclave, an oven for calcination, etc. which are necessary for heating purposes during the ceria nanoparticles preparation method, and the amount of ceria nanoparticles that can be prepared is only about a few milligrams, it may not be appropriate to apply the typical ceria nanoparticles preparation method to a commercial production process.

However, in the ceria nanoparticles preparation method in accordance with one or embodiments, by stirring a precursor mixed solution and performing a reaction process for a short time without implementing additional measures such as heating, the examples may not require separate special equipment. Additionally, the one or more examples may efficiently mass-synthesize ceria nanoparticles having a small average particle diameter and a uniform particle size distribution by a simple ceria nanoparticles preparation method. Accordingly, the preparing process may be simplified and the preparing costs may be lowered so that there are advantages of excellent convenience and economical efficiency.

Further, in the typical ceria nanoparticles preparation method, although mass production may be difficult due to a long heating time, etc., the ceria nanoparticles preparation method according to the examples may quickly prepare the ceria nanoparticles in large quantities since the method may prepare the ceria nanoparticles at low temperatures in a short period of time.

Further, the typical ceria nanoparticles preparation methods have had problems wherein it is not only difficult to uniformly prepare them to a nano-size, but it is also not easy to prepare them to a fine size of about 100 nm or less. However, the ceria nanoparticles preparation method according to the examples may enable ceria nanoparticles having a small average particle diameter and a uniform particle size distribution to be efficiently mass-synthesized at room temperature by a simple ceria nanoparticles preparation method.

Accordingly, there is an advantage that it is possible to provide large quantities of ceria nanoparticles that can be usefully implemented in various fields such as, but not limited to, bio/medical fields, materials in battery/energy fields, and catalysts for electrochemical reactions.

According to an example, although the mixed solution may be composed of a solvent, a cerium precursor, and an imidazole derivative, the examples are not limited thereto.

The example ceria nanoparticles preparation method may enable the mass synthesis of ceria nanoparticles having a uniform size by simply using a mixed solution consisting of the cerium precursor and the imidazole derivative only without an additional additive such as a surfactant. Accordingly, since the preparing process may be simplified, the preparation costs may be lowered so that there are advantages of excellent convenience and economic efficiency.

According to an example, although the cerium precursor may include one of cerium(III) acetate hydrate, cerium(III) acetylacetonate hydrate, cerium(III) carbonate hydrate, cerium(IV) hydroxide, cerium(III) fluoride, cerium(IV) fluoride, cerium(III) chloride, cerium(III) chloride heptahydrate, cerium(III) bromide, cerium(III) iodide, cerium(III) nitrate hexahydrate, cerium(III) oxalate hydrate, cerium(III) sulfate, cerium(III) sulfate hydrate, cerium(IV) sulfate, cerium nitrate, cerium ammonium nitrate, cerium sulfate, cerium phosphate, cerium chloride, cerium carbonate, cerium acetate, and combinations thereof, the examples are not limited thereto.

In an example, although the cerium precursor may be cerium(III) acetate hydrate, the examples are not limited thereto.

The shape of the nanoparticles may be changed depending on the type of the cerium precursor. In an example, when $CeCl_3$ or $Ce(NO_3)_3$ is used as a precursor, nanoparticles in the form of a cube may be formed.

According to an example, although the imidazole derivative may include one of imidazole, 2-methylimidazole, benzimidazole, naphthimidazole, phenanthroimidazole, pyridiimidazole (pyridine imidazole), pyrazineimidazole (pyrazine imidazole), quinoxalineimidazole (quinoxaline imidazole), 4-methylimidazole, 4-methyl-2-phenylimidazole, and combinations thereof, the examples are not limited thereto.

In an example, although the imidazole derivative may be imidazole, the examples are not limited thereto.

Imidazole may be used as a precipitating agent and a stabilizing agent to enable rapid and effective preparation of nanoparticles.

According to an example, although the solvent of the mixed solution may include one of distilled water, acetone, xylene, toluene, mesitylene, octyl ether, butyl ether, hexyl ether, decyl ether, pyridine, dimethyl sulfoxide, dimethylformamide, octanol, decanol, octane, decane, dodecane, tetradecane, hexadecane, hexane, carbon disulfide, chlorobenzene, dioxolane, tetrahydrofuran (THF), ethylenediamine, ethanol, methanol, and combinations thereof, the examples are not limited thereto.

In an example, although the solvent of the mixed solution may be distilled water, the examples are not limited thereto.

The solvent of the mixed solution may be adjusted so that the average particle diameter of the ceria nanoparticles may be adjusted.

In an example, when distilled water is used as the solvent of the mixed solution, ceria nanoparticles having a uniform average particle diameter of about 4 nm may be prepared, and when acetone is used as the solvent of the mixed solution, ceria nanoparticles having a uniform average particle diameter of about 120 nm may be prepared.

Subsequently, an operation of preparing ceria nanoparticles by stirring the mixed solution is performed (operation S200).

According to an example, although the stirring may be performed by one of a magnetic bar, a magnetic stirrer, a rotary mixer, shaker, rotators, and combinations thereof, the examples are not limited thereto.

In an example, although the stirring may be performed using the magnetic bar, the examples are not limited thereto.

The ceria nanoparticles preparation method, in accordance with one or more embodiments, by simply stirring the mixed solution and performing a reaction process for a short time without additional measures such as heating, the examples remove the need for separate special equipment. Additionally, to the examples efficiently mass-synthesize ceria nanoparticles having a small average particle diameter and a uniform particle size distribution by a simple method. Accordingly, the preparing process may be simplified and the preparing costs may be lowered so that there are advantages of excellent convenience and economical efficiency.

According to an example, although the operation of preparing the ceria nanoparticles may be performed for about 1 minute to about 3 hours, the examples are not limited thereto.

In an example, although the operation of preparing the ceria nanoparticles may be performed for about 1 hour to about 3 hours, the examples are not limited thereto.

In the typical ceria nanoparticles preparation method, although there has been a problem that mass production is difficult due to a long heating time, etc., the ceria nanoparticles preparation method according to the examples herein may quickly prepare the ceria nanoparticles in large quantities since the example preparation process may prepare the ceria nanoparticles at low temperatures in a short time.

In one or more examples, although the operation of washing the ceria nanoparticles may be further included, the examples are not limited thereto.

In one or more examples, although the washing operation may be performed one or more times by using a solution selected from at least one of acetone, distilled water, isopropanol, n-propanol, methanol, ethanol, 1-methyl-2-pyrrolidone, and combinations thereof, the examples are not limited thereto.

In an example, although the washing operation may be performed using an acetone solution, the examples are not limited thereto.

In one or more examples, although the operation of drying the ceria nanoparticles may be further included, the examples are not limited thereto.

The second aspect of the examples provides ceria nanoparticles prepared by the method according to the first aspect of the examples.

With respect to the ceria nanoparticles of the second aspect of the examples, although detailed descriptions are omitted for parts overlapping with the first aspect of the examples, the contents described in the first aspect of the examples may be equally applied to the second aspect of the examples even if the descriptions are omitted.

In accordance with one or more examples, although the ceria nanoparticles may have an average particle diameter of about 1 nm to about 200 nm, the examples are not limited thereto.

In an example, although the ceria nanoparticles may have an average particle diameter of about 3 nm to about 5 nm, the examples are not limited thereto.

Specifically, since the example ceria nanoparticles may have a uniform size of about 4 nm, they may be usefully implemented in various fields such as, but not limited to, bio/medical fields, materials in battery/energy fields, and catalysts for electrochemical reactions.

The third aspect of the examples provides an antioxidant including the ceria nanoparticles according to the second aspect of the examples.

With respect to the antioxidant of the third aspect of the examples, although detailed descriptions of parts overlapping with the second aspect of the examples are omitted, the contents described in the second aspect of the examples may be equally applied to the third aspect of the examples even if the descriptions are omitted.

Since the ceria nanoparticles according to the examples show a mixed state of $Ce^{3+}$ and $Ce^{4+}$, they may have excellent free radical removal activity through a self-regenerating redox reaction by a change in the oxidation state between $Ce^{3+}$ and $Ce^{4+}$ on the surface of $CeO_2$ nanoparticles. Therefore, the ceria nanoparticles may be usefully implemented as an antioxidant.

Further, since the ceria nanoparticles according to the examples may be mass-produced while retaining characteristics of having a small average particle diameter and a uniform particle size distribution, they may be usefully implemented industrially as an antioxidant.

Hereinafter, although the embodiments will be described in more detail through examples, the following examples are merely for explanation purposes and are not intended to limit the scope of the examples.

[Example] Preparing of Ceria Nanoparticles 1 mmol of cerium(III) acetate hydrate and 6 mmol of imidazole were each dissolved in 25 ml of distilled water.

Subsequently, after mixing a solution of cerium(III) acetate hydrate described above and a solution of imidazole described above, a reaction was performed at room temperature for 3 hours by stirring the mixed solution using a magnetic bar. After completing the reaction, washing a reaction solution containing ceria nanoparticles three times with acetone, and drying the washed ceria nanoparticles, the dried ceria nanoparticles were redispersed in distilled water.

Figure 2:
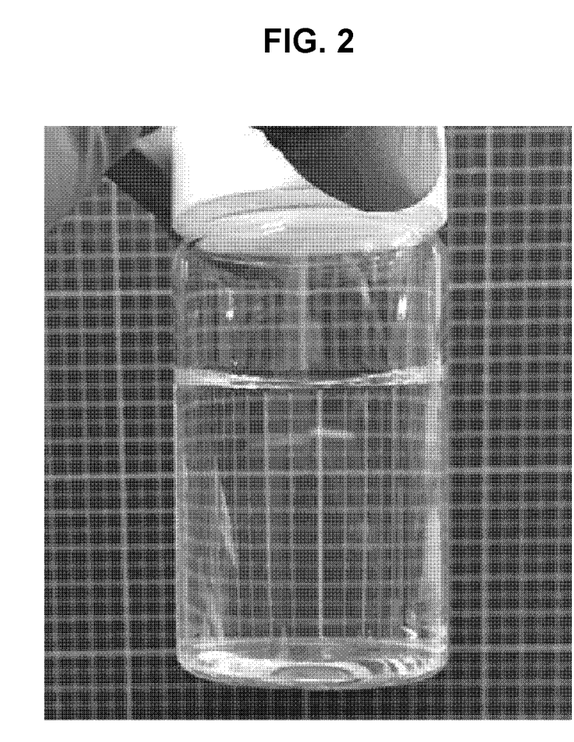
FIG. 2 is a photograph of an example aqueous solution containing ceria nanoparticles, in accordance with one or more embodiments.

FIG. 2 is a photograph of an aqueous solution containing ceria nanoparticles, in accordance with one or more embodiments.

Accordingly, it could be confirmed that ceria nanoparticles were actually prepared, and a stable water dispersion state could be confirmed.

Experimental Example 1

Figure 3A:
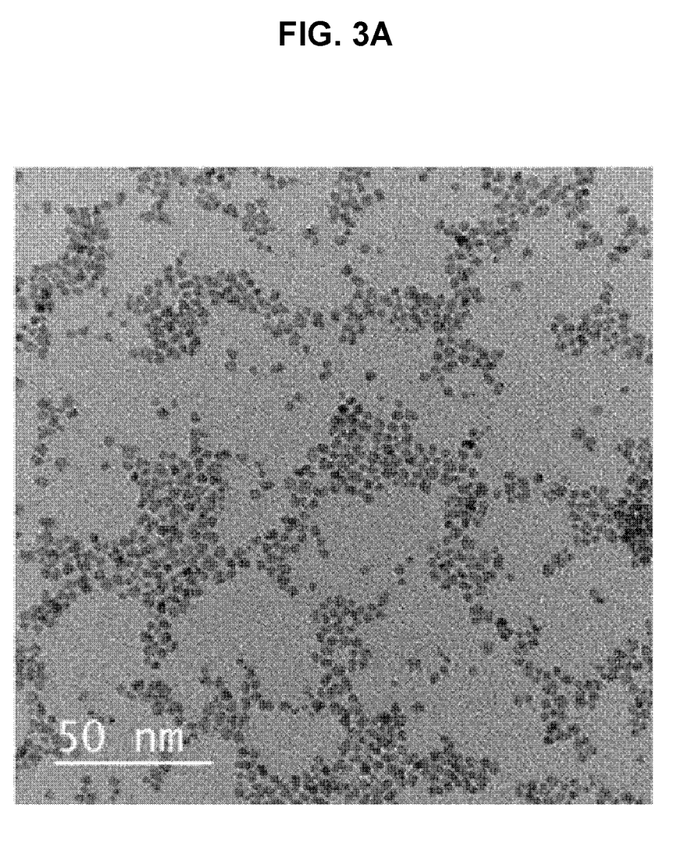
FIG. 3A and FIG. 3B illustrate example transmission electron microscope (TEM) images of the ceria nanoparticles, in accordance with one or more embodiments.
Figure 3B:
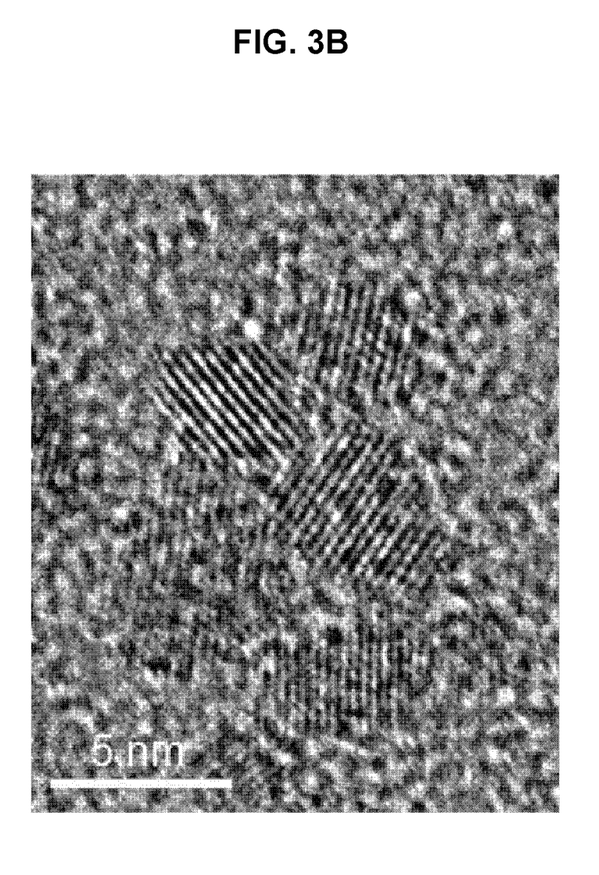

FIG. 3A and FIG. 3B illustrate transmission electron microscope (TEM) images of the ceria nanoparticles in accordance with one or more embodiments.

Specifically, the ceria nanoparticles in accordance with one or more embodiments were photographed to a low magnification (FIG. 3A) and a high magnification (FIG. 3B) using a transmission electron microscope (TEM).

It could be confirmed through this that the ceria nanoparticles prepared by the example method had a uniform diameter size of about 4.1 nm.

Experimental Example 2

Figure 4:
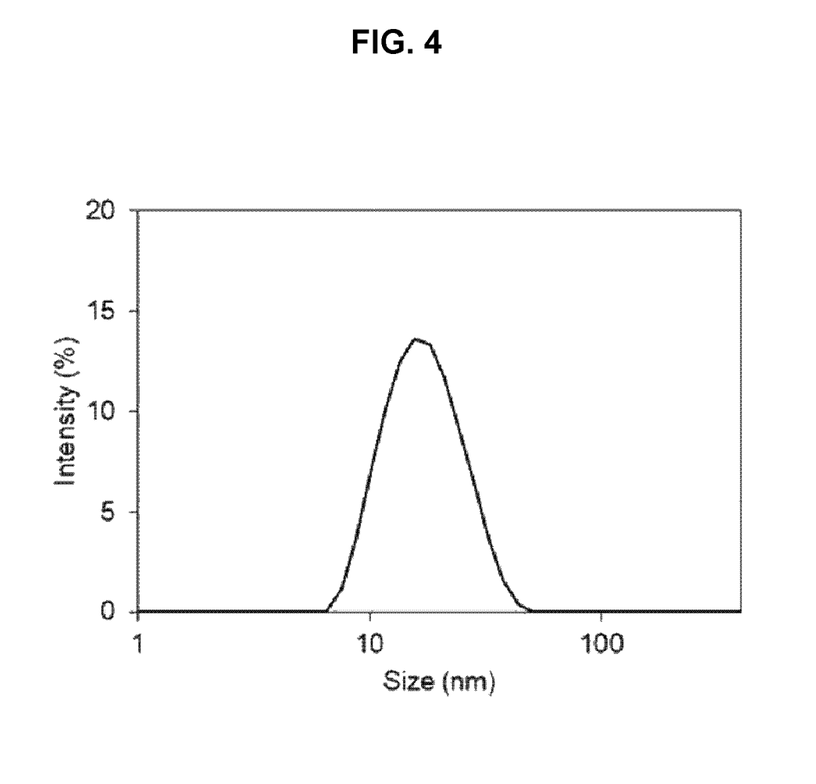
FIG. 4 is a graph illustrating results of measuring sizes of the ceria nanoparticles using dynamic light scattering, in accordance with one or more embodiments.

FIG. 4 is a graph illustrating results of measuring sizes of the ceria nanoparticles according to an embodiment of the present application using dynamic light scattering (DLS).

It could be confirmed through this that the sizes of the ceria nanoparticles prepared by the example method had a narrow distribution from an average size represented by 15.9±0.1 nm. This suggests that the ceria nanoparticles prepared by the example method may have a uniform size.

Experimental Example 3

Figure 5:
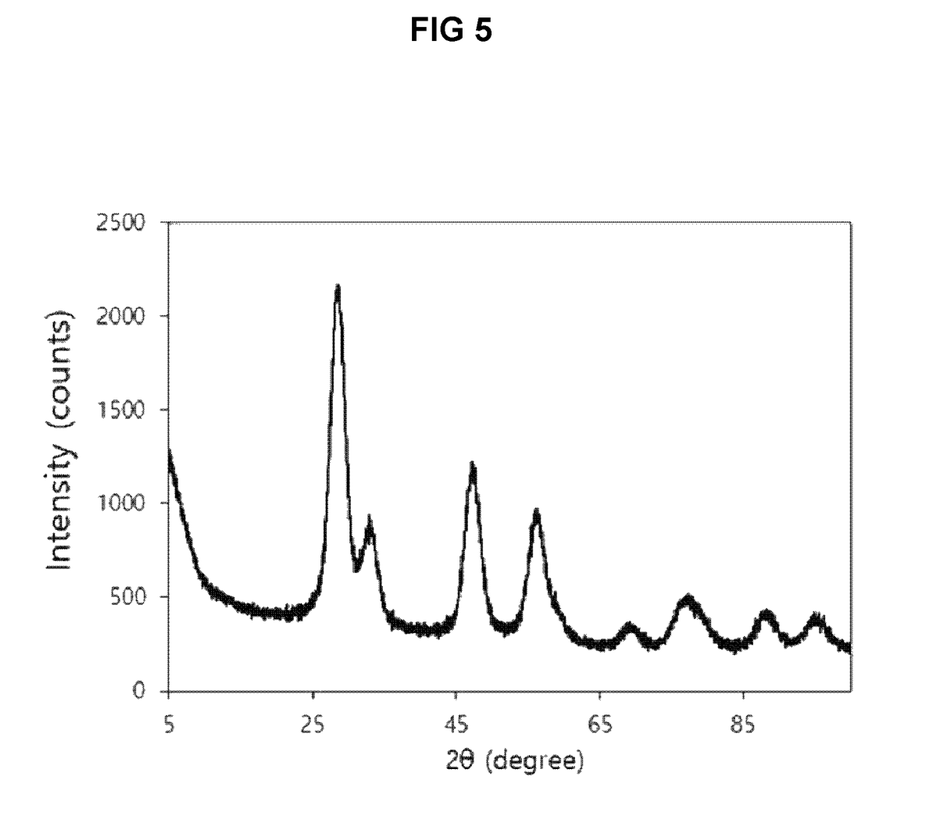
FIG. 5 is a graph illustrating results of analyzing the ceria nanoparticles using X-ray diffraction analysis, in accordance with one or more embodiments.

FIG. 5 is a graph illustrating results of analyzing the ceria nanoparticles in accordance with one or more embodiments using X-ray diffraction analysis.

It could be confirmed through this that ceria nanoparticles having a $CeO_2$ structure were actually prepared.

Experimental Example 4

Figure 6:
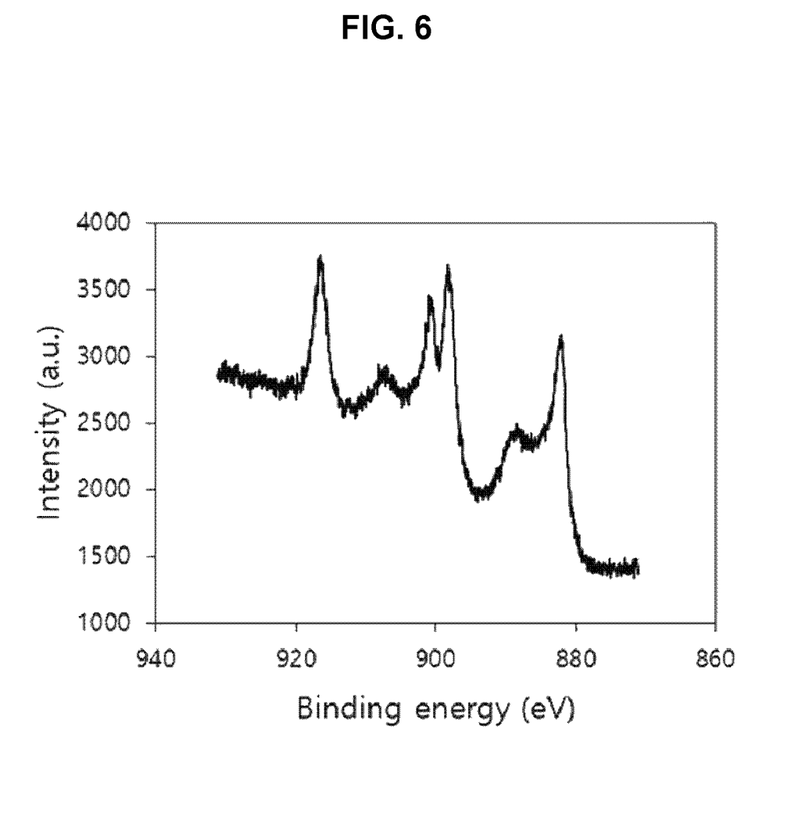
FIG. 6 is a graph showing results of analyzing the ceria nanoparticles using X-ray photoelectron spectroscopy, in accordance with one or more embodiments.

FIG. 6 is a graph illustrating results of analyzing the ceria nanoparticles in accordance with one or more embodiments using X-ray photoelectron spectroscopy (XPS).

It could be confirmed through this that the ceria nanoparticles prepared by the example method showed a mixed state of $Ce^{3+}$ and $Ce^{4+}$. Accordingly, the ceria nanoparticles prepared by the example method may have superior reactive oxygen species removal ability through a self-regenerating redox reaction due to a change in the oxidation state between $Ce^{3+}$ and $Ce^{4+}$ on the surface of the nanoparticles.

Experimental Example 5

Figure 7A:
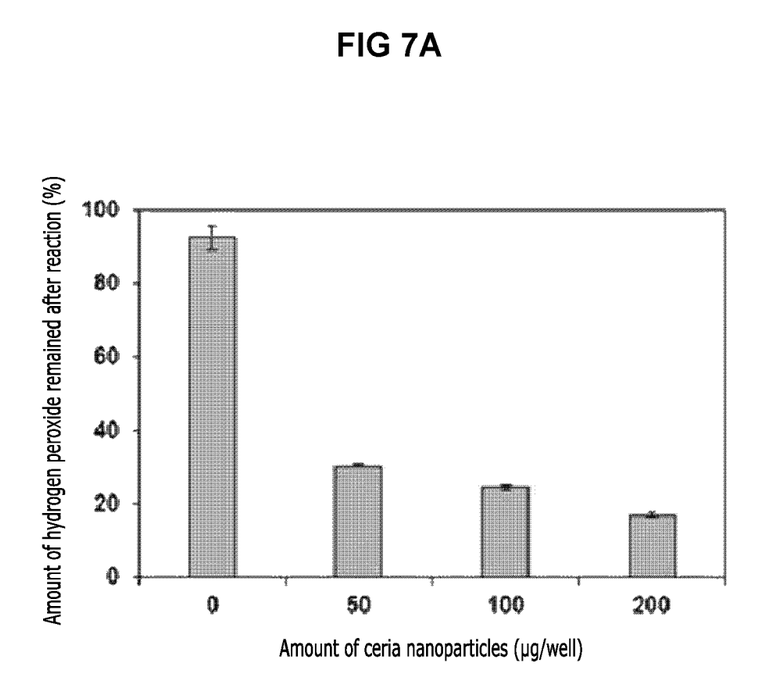
FIG. 7A and FIG. 7B are graphs illustrating results of measuring reactive oxygen species removal abilities of the ceria nanoparticles, in accordance with one or more embodiments.
Figure 7B:
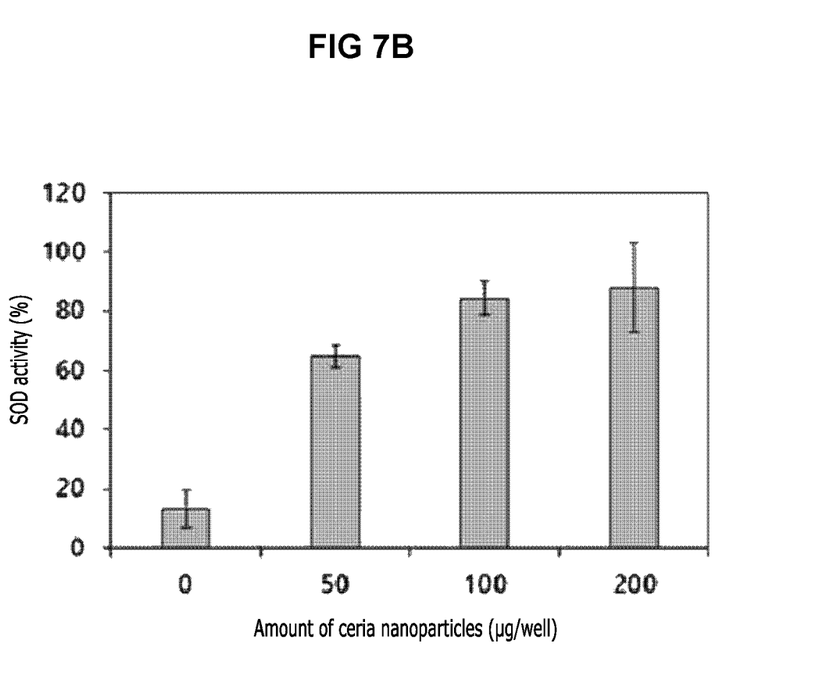

FIG. 7A and FIG. 7B are graphs illustrating results of measuring reactive oxygen species removal abilities of the ceria nanoparticles, in accordance with one or more embodiments.

Specifically, FIG. 7A is a graph illustrating results of measuring catalase-mimicking activities (hydrogen peroxide decomposition rates) of the ceria nanoparticles according to an example using an Amplex™ Red Hydrogen Peroxide/Peroxidase Assay, and FIG. 7B is a graph illustrating results of measuring superoxide dismutase-mimicking activities of the ceria nanoparticles in accordance with one or more embodiments using an SOD Assay.

It could be confirmed through this that the ceria nanoparticles prepared by the example method had superior reactive oxygen species removal ability. This suggests that since the example ceria nanoparticles preparation method is performed at room temperature, ceria nanoparticles with superior reactive oxygen species removal performance may be prepared in large quantities by retaining characteristics of having a small average particle diameter and a uniform particle size distribution.

Accordingly, the examples may provide an antioxidant including the ceria nanoparticles.

However, technical tasks to be achieved by the examples are not limited to the technical tasks as described above, and other technical tasks may exist.

A first aspect of the examples provides a ceria nanoparticles preparation method including the operations of preparing a mixed solution containing a cerium precursor and an imidazole derivative, and preparing ceria nanoparticles by stirring the mixed solution.

The operation of preparing the ceria nanoparticles may be performed at room temperature. However, the examples are not limited thereto.

Although the mixed solution may be composed of a solvent, a cerium precursor, and an imidazole derivative, the examples are not limited thereto.

Although the cerium precursor may include one of cerium (III) acetate hydrate, cerium(III) acetylacetonate hydrate, cerium(III) carbonate hydrate, cerium(IV) hydroxide, cerium(III) fluoride, cerium(IV) fluoride, cerium(III) chloride, cerium(III) chloride heptahydrate, cerium(III) bromide, cerium(III) iodide, cerium(III) nitrate hexahydrate, cerium (III) oxalate hydrate, cerium(III) sulfate, cerium(III) sulfate hydrate, cerium(IV) sulfate, cerium nitrate, cerium ammonium nitrate, cerium sulfate, cerium phosphate, cerium chloride, cerium carbonate, cerium acetate, and combinations thereof, the examples are not limited thereto.

Although the imidazole derivative may include one of imidazole, 2-methylimidazole, benzimidazole, naphthimidazole, phenanthroimidazole, pyridiimidazole (pyridine imidazole), pyrazineimidazole (pyrazine imidazole), quinoxalineimidazole (quinoxaline imidazole), 4-methylimidazole, 4-methyl-2-phenylimidazole, and combinations thereof, the examples are not limited thereto.

Although the solvent of the mixed solution may include one of distilled water, acetone, xylene, toluene, mesitylene, octyl ether, butyl ether, hexyl ether, decyl ether, pyridine, dimethyl sulfoxide, dimethylformamide, octanol, decanol, octane, decane, dodecane, tetradecane, hexadecane, hexane, carbon disulfide, chlorobenzene, dioxolane, tetrahydrofuran (THF), ethylenediamine, ethanol, methanol, and combinations thereof, the examples are not limited thereto.

Although the stirring may be performed using one of a magnetic bar, a magnetic stirrer, a rotary mixer, shaker, rotators, and combinations thereof, the examples are not limited thereto.

Although the preparing of the ceria nanoparticles may be performed for 1 minute to 3 hours, the examples are not limited thereto.

Although an operation of washing the ceria nanoparticles may be further included, the examples are not limited thereto.

Although the washing operation may be performed one or more times by using a solution selected from acetone, distilled water, isopropanol, n-propanol, methanol, ethanol, 1-methyl-2-pyrrolidone, and combinations thereof, the examples are not limited thereto.

Although an operation of drying the ceria nanoparticles may be further included, the examples are not limited thereto.

A second aspect provides ceria nanoparticles prepared by the method according to the first aspect.

The ceria nanoparticles may have an average particle diameter of 1 to 200 nm. However, the examples are not limited thereto.

A third aspect provides an antioxidant including the ceria nanoparticles according to the second aspect of the examples.

Typically, in preparing ceria nanoparticles, there has been a problem that uniformity and reactive oxygen species removal performance of the nanoparticles are greatly lowered since the operation of performing a heating process to high temperatures for a long time in the synthesis process is essentially included. However, since a ceria nanoparticles preparation method according to the examples is performed at room temperature, it may prepare ceria nanoparticles having a small average particle diameter and a uniform particle size distribution in large quantities.

Further, in the typical ceria nanoparticles preparation, since special equipment such as a hot plate, an autoclave, an oven for calcination, etc. which are necessary for heating, and the amount of ceria nanoparticles that can be prepared is only about a few milligrams, there has been a problem that it is not appropriate to apply the typical method to a commercial production process. However, the ceria nanoparticles preparation method according to the examples not only does not require separate special equipment by stirring a precursor mixed solution and performing a reaction process for a short time without additional measures such as heating, but also makes it possible to efficiently mass-synthesize ceria nanoparticles having a small average particle diameter and a uniform particle size distribution by a simple method. Accordingly, the preparing process may be simplified and the preparing costs may be lowered so that there are advantages of excellent convenience and economical efficiency.

Further, in the typical ceria nanoparticles preparation method, although there has been a problem that mass production is difficult due to a long heating time, etc., the ceria nanoparticles preparation method according to the examples can quickly prepare the ceria nanoparticles in large quantities since it can prepare the ceria nanoparticles at low temperatures in a short time.

Further, the typical ceria nanoparticles preparation method has had problems that it is not only difficult to uniformly prepare them to a nano-size, but it is also not easy to prepare them to a fine size of 100 nm or less. However, the ceria nanoparticles preparation method according to the examples enables ceria nanoparticles having a small average particle diameter and a uniform particle size distribution to be efficiently mass-synthesized at room temperature by a simple method.

Further, the ceria nanoparticles preparation method according to the examples enables mass synthesis of ceria nanoparticles having a uniform size by simply using a mixed solution consisting of a cerium precursor and an imidazole derivative only without an additional additive such as a surfactant. Accordingly, since the preparing process may be simplified, the preparing costs may be lowered so that convenience and economic efficiency may be excellent.

Further, since ceria nanoparticles according to the examples have a uniform size of about 4 nm, they may be usefully used in various fields such as bio/medical fields, materials in battery/energy fields, and catalysts for electrochemical reactions.

Further, since the ceria nanoparticles according to the examples can be mass-produced while retaining characteristics of having a small average particle diameter and a uniform particle size distribution, they may be usefully used industrially as an antioxidant.

The aforementioned description of the present application is for illustration purposes, and those with ordinary skill in the art to which the present application pertains will be able to understand that the examples may be easily modified into other specific forms without changing technical ideas or essential features of the examples. Accordingly, the examples should be understood not to be limited. For example, each constituent element described as a single form may also be dispersed and implemented, and similarly, constituent elements described as dispersed may also be implemented in a combined form.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A ceria nanoparticles preparation method, comprising:
   preparing a cerium precursor dissolved in distilled water,
   preparing an imidazole or an imidazole derivative dissolved in distilled water;
   preparing ceria nanoparticles by stirring a mixed solution containing the cerium precursor and the imidazole, or a mixture solution containing the cerium precursor and the imidazol derivative; and
   washing the ceria nanoparticles one or more times by using a solution selected from the group consisting of acetone, isopropanol, n-propanol, 1-methyl-2-pyrrolidone, and combinations thereof,
   wherein the ceria nanoparticles preparation method is performed at room temperature, and
   wherein the ceria nanoparticles have an average particle diameter of 3 to 5 nm.

2. The method of claim 1, wherein the mixed solution is composed of the distilled water, the cerium precursor, and the imidazole derivative.

3. The method of claim 1, wherein the cerium precursor includes one of cerium(III) acetate hydrate, cerium(III) acetylacetonate hydrate, cerium(III) carbonate hydrate, cerium(IV) hydroxide, cerium(III) fluoride, cerium(IV) fluoride, cerium(III) chloride, cerium(III) chloride heptahydrate, cerium(III) bromide, cerium(III) iodide, cerium(III) nitrate hexahydrate, cerium(III) oxalate hydrate, cerium(III) sulfate, cerium(III) sulfate hydrate, cerium(IV) sulfate, cerium nitrate, cerium ammonium nitrate, cerium sulfate, cerium phosphate, cerium chloride, cerium carbonate, cerium acetate, and combinations thereof.

4. The method of claim 1, wherein the imidazole derivative is selected from the group consisting of 2-methylimidazole, benzimidazole, naphthimidazole, phenanthroimidazole, pyridiimidazole (pyridine imidazole), pyrazineimidazole (pyrazine imidazole), quinoxalineimidazole (quinoxaline imidazole), 4-methylimidazole, 4-methyl-2-phenylimidazole, and combinations thereof.

5. The method of claim 1, wherein the stirring of the mixed solution is performed with one of a magnetic bar, a magnetic stirrer, a rotary mixer, shaker, rotators, and combinations thereof.

6. The method of claim 1, wherein the ceria nanoparticles preparation method is performed for 1 minute to 3 hours.

7. The method of claim 1, further comprising drying the ceria nanoparticles.

8. The method according to claim 1, further comprising adjusting a solvent of the mixed solution to adjust a diameter of the ceria nanoparticles.

9. The method of claim 8, further comprising providing an antioxidant that includes the ceria nanoparticles.

10. The method of claim 1, wherein the mixed solution is composed of distilled water, the cerium precursor, and the imidazole.

\* \* \* \* \*